United States Patent
Swartz (10) Patent No.: US 7,620,653 B1
(45) Date of Patent: Nov. 17, 2009

(54) SERVICE FOR RETRIEVING AND AGGREGATING DATA USED TO GENERATE WEB PAGES OR OTHER CONTENT ITEMS

(75) Inventor: Jonathan E. Swartz, Seattle, WA (US)

(73) Assignee: Amazon Technologies, Inc., Incline Village, NV (US)

(*) Notice: Subject to any disclaimer, the term of this patent is extended or adjusted under 35 U.S.C. 154(b) by 222 days.

(21) Appl. No.: 11/275,862

(22) Filed: Feb. 1, 2006

(51) Int. Cl.
*G06F 17/00* (2006.01)

(52) U.S. Cl. .................. 707/103 R; 707/3; 707/10; 707/102; 709/203; 709/219; 709/224; 709/238; 709/239

(58) Field of Classification Search .............. None
See application file for complete search history.

(56) References Cited

U.S. PATENT DOCUMENTS

| | | | |
|---|---|---|---|
| 5,634,113 A * | 5/1997 | Rusterholz | 716/13 |
| 5,974,443 A | 10/1999 | Jeske | |
| 5,983,227 A * | 11/1999 | Nazem et al. | 707/10 |
| 6,138,122 A * | 10/2000 | Smith et al. | 707/103 R |
| 6,262,729 B1 * | 7/2001 | Marcos et al. | 715/744 |
| 6,415,335 B1 * | 7/2002 | Lowery et al. | 710/5 |
| 6,601,057 B1 * | 7/2003 | Underwood et al. | 707/1 |
| 7,133,908 B1 * | 11/2006 | Pajak et al. | 709/223 |
| 7,194,678 B1 * | 3/2007 | Koike et al. | 715/234 |
| 7,331,038 B1 * | 2/2008 | Snodgrass et al. | 717/123 |
| 2002/0103856 A1 | 8/2002 | Hewett et al. | |
| 2002/0152244 A1 * | 10/2002 | Dean et al. | 707/530 |
| 2003/0154213 A1 * | 8/2003 | Ahn | 707/103 X |
| 2004/0015476 A1 * | 1/2004 | Twaddle | 707/1 |
| 2004/0041840 A1 * | 3/2004 | Green et al. | 345/776 |
| 2004/0177113 A1 * | 9/2004 | Nguyen | 709/203 |
| 2004/0230897 A1 * | 11/2004 | Latzel | 715/513 |
| 2005/0181835 A1 * | 8/2005 | Lau et al. | 455/567 |
| 2005/0278617 A1 * | 12/2005 | Martell et al. | 715/513 |
| 2006/0235961 A1 * | 10/2006 | Klein et al. | 709/224 |

FOREIGN PATENT DOCUMENTS

| | | |
|---|---|---|
| WO | WO 01/82068 A1 * | 11/2001 |
| WO | WO 02/19162 A2 * | 3/2002 |

(Continued)

OTHER PUBLICATIONS

Suresha, Jayant R. Haritsa, An integrated approach for reducing dynamic web page construction time, Sep. 21, 2004.*

(Continued)

*Primary Examiner*—Pierre M Vital
*Assistant Examiner*—Augustine Obisesan
(74) *Attorney, Agent, or Firm*—Knobbe Martens Olson & Bear LLP (57) ABSTRACT

An aggregation service acts as an intermediary between a template (or template processor) and a set of two or more services that supply data for generating web pages or other types of content items. The aggregation service stores dependency information in connection with the set of services, and uses this information to control the order and timing with which service requests are made on behalf of the template/template processor. The aggregation service aggregates the retrieved service data for incorporation into the template, and in some cases, formats the service data for display.

23 Claims, 5 Drawing Sheets

FOREIGN PATENT DOCUMENTS

WO     WO 02/060558 A2 *   8/2002

OTHER PUBLICATIONS

Shantanu Shah, Generating a web graph, Dept of Computer scince, Cornell university.*

Keller et al, Determining Service Dependencies in Distributed Systems, IBM T.J. Watson Research Center, USA.*

Nanopoulos et al, A data Mining Algorithm for generalized Web Prefetching, IEE Computer Society.*

A Graph-Based Approach to Web Services COmposition, Hashemian et al (Proceedings of the 2005 Symposium on Application and the Internet (SAINT'05)).*

Combining client knowledge and resource dependencies for improved World Wide Web performance, Hine et al, (Jul. 30, 1998).*

A fragment-based approach for efficiently creating dynamic web content, Challenger et al (ACM transaction on internet technology, vol. 5, No. 2, May 2005, pp. 359-398).*

Commonly owned U.S. Appl. No. 10/612,529, filed Jul. 2, 2003. (Filing Receipt, Specification and Drawings are submitted herewith as a single PDF document).

Commonly owned U.S. Appl. No. 10/260,215, filed Sep. 27, 2002. (Filing Receipt, Specification and Drawings are submitted herewith as a single PDF document).

* cited by examiner

SERVICE FOR RETRIEVING AND AGGREGATING DATA USED TO GENERATE WEB PAGES OR OTHER CONTENT ITEMS

BACKGROUND OF THE INVENTION

1. Field of the Invention

The present invention relates to techniques improving the performance of systems that serve content in response to requests from clients. In particular, the present invention relates to an aggregation system and a method for aggregating data received from one or more services, such as data used to dynamically generate web pages or other types of content objects.

2. Description of the Related Technology

In the course of dynamically generating a web page, a web server machine commonly makes service requests over a network to one or more services to obtain the data needed to generate the page. The particular service requests are commonly specified, at least partially, by a document template that is interpreted and/or executed by the web server machine. The template also typically specifies how the retrieved service data is to be assembled into a web page.

The particular service requests used to generate a web page are often "chained," meaning that one or more service requests cannot be made until the results of one or more other service requests are received. For example, a service request may use the result of another service request as a parameter. Such chaining of service requests often increases page-generation latency by reducing the degree to which data can be retrieved and processed in parallel.

Additional latency is commonly introduced due to the complexity of handling the dependencies and relationships between different service requests. For example, in many cases, an unnecessary delay will occur between the arrival of a particular service request result and the transmission of a service request that is dependent upon that result. As another example, delay is sometimes introduced by unnecessarily making duplicate or redundant service requests.

In many cases, the performance of a distributed web page generation system can be improved by caching the results of service requests on the web server machine. However, the web server machines may not have adequate memory to cache all, or even a significant portion of, the service data likely to be re-used. Moreover, caching schemes do not provide an effective way of handling dependencies among services requests.

SUMMARY OF SPECIFIC EMBODIMENTS

One aspect of the invention is an aggregation service that acts as an intermediary between a template processor and a set of two or more services that supply data used by the template processor to generate web pages. During the course of generating a web page or other content item, the aggregation service makes service requests to these services on behalf of a template processor while handling dependencies between the service requests. In one embodiment, the aggregation service efficiently handles such dependencies by using a dependency graph structure to control the sequence and timing with which particular service requests are made. The aggregation service may also aggregate and format the retrieved service data for use by the template processor. In addition to reducing latency caused by service request dependencies, the aggregation service simplifies template designs, allowing calls to multiple different services to be replaced with a call to the aggregation service.

Neither this summary nor the following detailed description defines or limits the invention. The invention is defined by the claims.

BRIEF DESCRIPTION OF THE DRAWINGS

A aggregation service according to specific embodiments of the invention will now be described with reference to the drawings summarized below, which are intended to illustrate, and not limit, the invention.

DETAILED DESCRIPTION OF SPECIFIC EMBODIMENTS

The following detailed description is directed to certain specific embodiments of the invention. As will be apparent, the invention is not limited to the particular embodiments and applications described herein. As one example, although described primarily in the context of a web page generation system, the invention may also be used in other environments in which a server retrieves data from one or more data sources, and uses the retrieved data to generate content to provide to users. The scope of the invention is defined only by the claims.

As discussed above, a web page generation system may generate web pages using data received as the result of making one or more service requests. The particular service requests that are made, and the manner in which the service request results are assembled into a web page, are typically specified by a web page template. Frequently, the service requests needed to generate a web page are interrelated and have dependencies with each other. For example, a group of interrelated service requests may be made to retrieve data descriptive of a particular content object such as an item or product in an inventory, manufacturing, or e-commerce system, or a person in a customer or employee system. Where dependencies exist between the service requests, some service requests will typically be blocked until other service requests are completed. Unless the dependent service requests are launched as soon as the service data on which they depend becomes available, an unnecessary delay will typically occur in the generation of the web page.

One embodiment of the invention addresses this and other problems by providing an aggregation service that acts as an intermediary between a template (or template processor) and a set of two or more services that are commonly used in combination to generate a web page. The aggregation service stores pre-specified dependency information in connection with this set of services, and uses this information to control the sequence and timing with which service requests are made on behalf of the template/template processor. The aggregation service aggregates the retrieved service data for incorporation into the template, and in some cases, formats the service data for display.

By encapsulating complexities of making chained service requests, the aggregation service reduces the need for template authors to be concerned with service request dependencies, and provides a mechanism for handling these dependencies consistently and efficiently.

I. EXAMPLE SYSTEM ARCHITECTURE

Figure 1:
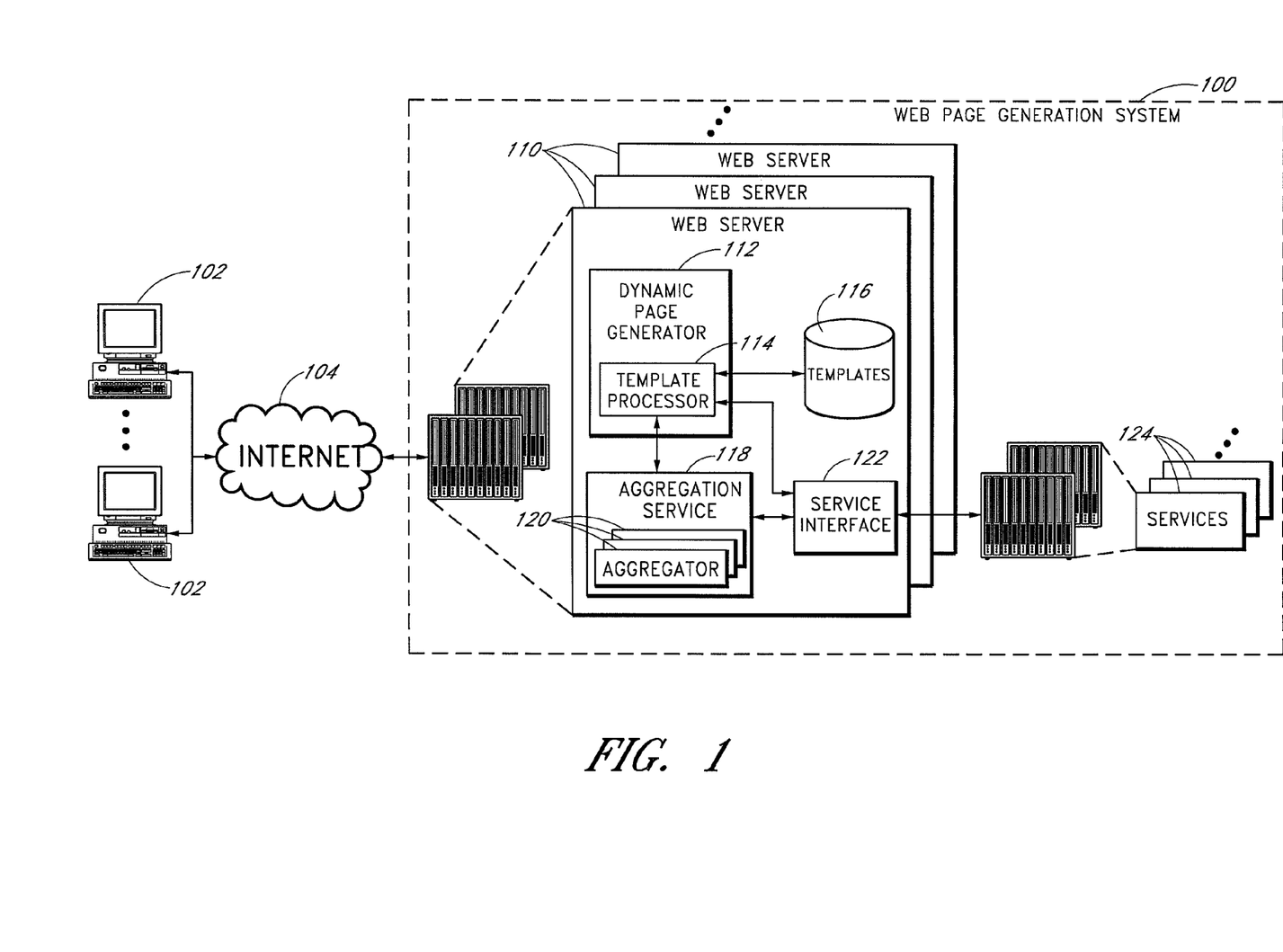
FIG. 1 is a block diagram of a web page generation system that includes an aggregation service according to one embodiment of the invention.

FIG. 1

FIG. 1 illustrates how the aggregation service may be implemented within a web page generation system 100. The system 100 receives requests for web pages from one or more client computing devices 102 via a network 140, such as the Internet. Each client computing device 102 may run a web browser application (not shown) capable of generating page requests in accordance with the HTTP protocol. Although shown for purposes of illustration as personal computers, the client computing devices can include any type or types of computing devices capable of generating page requests, including mobile phones, Personal Digital Assistants, set-top television boxes, and servers that retrieve and analyze web pages. Further, although described in the context of web pages, the invention may also be used in connection with the dynamic generation of other types of documents and content objects.

The system 100 shown in FIG. 1 includes multiple web server machines 110 ("web servers"), each of which may be capable of serving any web page, document, or other content item of a particular system, web site, or web services environment. For example, content items may include HTML documents, XML documents, or any other suitable type of data in such a system or environment. Each web server 110 executes a dynamic page generator component 112. The dynamic page generator 112 includes or consists of a template processor 114 that generates web pages using templates retrieved from a local repository 116.

Each template may, for example, be in the form of a Perl script or other set of instructions that are adapted to be interpreted or executed to generate a web page. Generally, each template corresponds to a particular type of page in a particular web site, such as a product detail page of an electronic catalog or a search results page used to display search results. In one embodiment, each template may include or reference one or more other templates, such that multiple templates may be used in combination to generate a web page. The templates may be executed, interpreted, or otherwise processed using any suitable method, including but not limited to the methods disclosed in U.S. patent Ser. No. 10/260,215, filed Sep. 27, 2002, and entitled "AUTOMATED EXPLOITATION OF INHERENT PARALLELISM IN THE DYNAMIC GENERATION OF WEB PAGES OR OTHER DOCUMENTS," the disclosure of which is hereby incorporated by reference. As will be recognized, the present invention does not require any particular type of template, and may be practiced in some embodiments without using templates.

Each web server 110 additionally includes a service interface 122 which provides a uniform mechanism for retrieving data from a set of services 124. Each such service 124 typically supplies a different type of data, and runs on a separate server or group of servers. The services 124 may, for example, include databases containing various types of data used to generate web pages, such as catalog content, inventory data, session state data, user browsing histories, and user profiles and account information. The services 124 may also provide functionality for performing various types of functions, such as authenticating users, executing purchase and/or rental transactions, generating personalized recommendations, posting content on a web site, and/or conducting interactive searches. The types of services provided in a web page generation system 100 can vary widely, and those mentioned here are merely illustrative.

Each web server 110 also hosts the aggregation service 118, which includes one or more aggregator objects or "aggregators" 120. Each aggregator 120 corresponds to a particular group of services 124 and service requests that are commonly used in combination to generate web pages. For instance, in the context of an electronic catalog of products, a "product" aggregator 120 may be provided for retrieving and aggregating some or all of the different types of service data available for particular products. These different types of data may, for example, include catalog description, price, availability, customer reviews, average rating, marketplace listings, etc., with each supplied by a different service 124. Because these various types of product information are commonly included in the same web page (such as a product detail page), the template processor 114 ordinarily has to send—and the template ordinarily has to specify-a number of separate service requests for retrieving the product data. If the aggregation service 118 is used, on the other hand, the template can be designed to retrieve all of these pieces of product information from a single source—namely the product aggregator. Thus, both the template, and the processing performed by the template processor 114, may be greatly simplified.

Aggregators 120 may additionally or alternatively be provided for retrieving and aggregating data associated with other types of items or objects. For instance, a "customer" aggregator 120 may be provided for retrieving and aggregating all of the different types of service data available for particular customers. Thus, the product aggregator 120 described herein represents just one of many possible applications for the present invention.

Templates may specify calls (service requests) to the aggregation service 118 in place of, or in addition to, calls to specific services 124. Thus, both the template processor 114 and the aggregation service 118 are capable of sending service requests to particular services 124.

In the system illustrated in FIG. 1, the aggregation service 118 is part of the software executed by each web server 110, either by the same processor (or processors) as the dynamic page generator 112 or on a different processor or processors. Alternatively, the aggregation service 118 may run on a different physical server.

The aggregator 120 for a particular instance of a content object may be implemented as an instance of a class of objects in an object oriented programming model. Each aggregator 120 provides an interface for the template processor 114 to request the aggregated data. The interface may be defined in terms of one or more methods or functions, each of which may correspond to one or more service requests. For instance, the product aggregator's interface may include a method for request a designated set of product data for a particular product ID or a list of product IDs.

In one embodiment, each aggregator 120 makes use of a directed acyclic graph that represents the dependencies between the service requests that provide the data corresponding to particular methods. An example of such a graph is discussed below with reference to FIG. 2. Any suitable data structure such as a table or linked list may be used to represent the graph and be stored with, or in association, with each of the aggregators 120. In one embodiment, the dependency graph is defined along instruction code associated with the aggregator. In other embodiments, the graph may be generated automatically based on the instruction code of the aggregator.

Although not depicted in FIG. 1, the dynamic page generator 112, the aggregation service 118, and/or the service interface 112 may use a cache for storing and retrieving service request results. For example, the web page generation system 100 may include a distributed cache service as disclosed in U.S. patent application Ser. No. 11/177,206, filed Jul. 8, 2005, and entitled "DATA CACHING SERVICE," the disclosure of which is hereby incorporated by reference.

In operation according to one embodiment, when a web server 110 receives a request for a web page from one of the client computers 102, its dynamic page generator 112 processes the corresponding template to identify any aggregator objects needed to process the page request. The template processor 114 instantiates a particular content object, such as a product or person, via a respective aggregator 120. Each aggregator 120 may be implemented as an aggregation class that is instantiated for a particular content object, depending on the programming model used.

The templates used by the template processor 114 may request all data associated with a particular aggregator 120 or may request only certain portions of that data. For example, a template that uses the above-mentioned product aggregator 120 may specify that only certain types of product information available from the product aggregator are to be requested and returned. By specifying particular methods of the aggregator 120, the template implicitly identifies service requests corresponding to those methods that are issued by the aggregator 120.

Based on the requested data regarding the content object, the aggregator 120 identifies service requests needed to provide the data requested by the template. The aggregator 120 creates an instance or copy of its directed graph that represents the dependencies of each of the identified service requests. Service requests are represented by nodes in the directed graph with the edges representing dependencies between the service requests. As described below, the aggregator 120 traverses the directed graph from the leaf nodes until one or more service requests that do not depend on other requests are identified, and then issues such non-dependent requests. After receiving the results of these service requests, the aggregator 120 traverses back to the leaf nodes as it issues and receives results of further service requests. In issuing the service requests, the aggregator 120 can traverse branches of the directed graph in parallel and issue multiple concurrent service requests.

Each service request is passed to the web server's service interface 122, which determines how to process the service request. The service interface 122 may communicate with the services 124 via one or more computer networks. Requests to local services 124 may be made over a local area network, and requests to remote services 124 may be made over a wide area network such as the Internet.

The dynamic page generator 112, aggregation service 118 and service interface 122 and may be embodied in code executed by one or more general purpose computers, and may be represented in any type of computer storage device or memory.

As will be apparent, aspects of the invention may be practiced in environments that differ from that of FIG. 1. For example, the aggregation service 118 could alternatively run on an email server, and could be used to facilitate the dynamic generation of email documents.

II. EXAMPLE DIRECTED GRAPH

Figure 2:
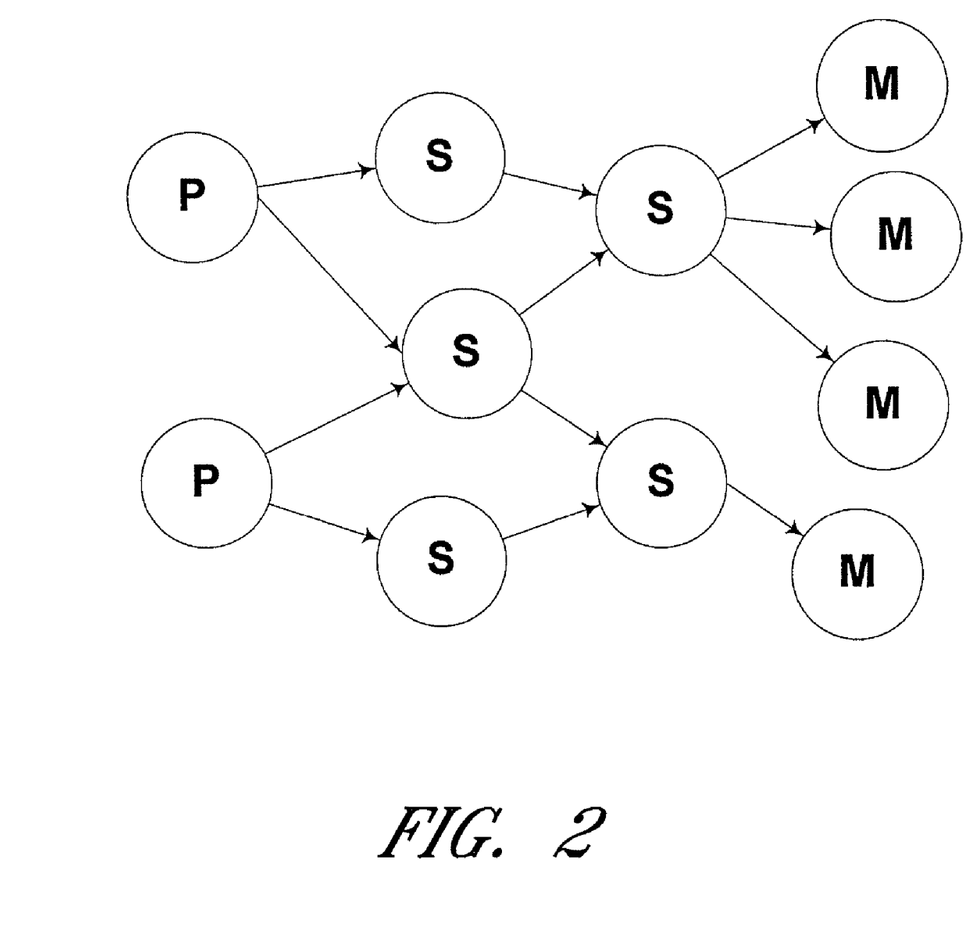
FIG. 2 illustrates a directed acyclic graph that represents the dependencies between an interrelated set of service requests that may be used to generate a web page in the web page generation system of FIG. 1.

FIG. 2

FIG. 2 illustrates a directed acyclic graph that represents the dependencies between an interrelated set of service requests that may be used to generate a web page according to one embodiment of the invention. As discussed above, one embodiment of the aggregation service 118 uses such directed acyclic graphs to control the sequence and timing with which service request are made. In operation, the template processor 114 instantiates the particular aggregator(s) 120 used by a particular template. In one embodiment, the template prefetches methods of the aggregator as part of instantiating the aggregator. Alternatively, the template may delay prefetching aggregator methods until later in its processing. However, the aggregator 120 generally does not begin issuing the corresponding service requests until the method is prefetched.

In the illustrated directed graph of FIG. 2, service requests are represented by nodes labeled with an "S." Inputs to the service requests are represented by parameter nodes which are labeled with a "P." In addition, methods (or functions) of the aggregator 120 are represented as method nodes which are labeled with an "M." Edges (from left to right in FIG. 2) represent dependencies. The graph of FIG. 2 includes two parameter nodes that have no included dependencies. Five service requests are represented by nodes that depend on the two parameter nodes and each other. Four method nodes depend directly on two of the service request nodes and indirectly on all of the illustrated service request nodes.

In operation according to one embodiment, the aggregator 120 traverses the graph (concurrently where possible) beginning from the method nodes and proceeding to the service request nodes as method nodes are prefetched. The aggregator first traverses up (right to the left) the graph in this "prefetch" traversal until parameter or other nodes with no dependencies are reached. The aggregator then traverses back down the graph (left to the right) and launches each service request. As each service request completes, the aggregator provides available data to make the service requests further along the left to right "launch" traversal. Advantageously, different portions of the graph may be traversed concurrently to minimize overall latency. In addition, data for particular methods may be made available for web page generation as soon as the left to right traversal reaches back to the method nodes.

Use of the dependency graph allows aggregation of service requests that might otherwise be made repeatedly. For example, a template or script for generating a web page might in turn execute one or more other templates that may make identical service requests. By using the aggregator, these otherwise identical service requests can be aggregated into a single service request to reduce load on the services, and reduce service request overhead.

In addition, service requests may be performed in parallel and long chains of service requests started as early as possible during web page generation to reduce page-generation times. For example, in a system that uses a template to generate a web page, a particular datum may not be required until the template nearly completes execution. If the generation of that particular datum requires a relatively long or time-consuming chain of service requests, the response time of the template may be adversely affected by the late request. However, by aggregating service requests according to one embodiment, chains of service requests can be started early and execute concurrently while the template processor continues generating the web page using other data.

II. WEB SERVER AND AGGREGATION PROCESSES

Figure 3:
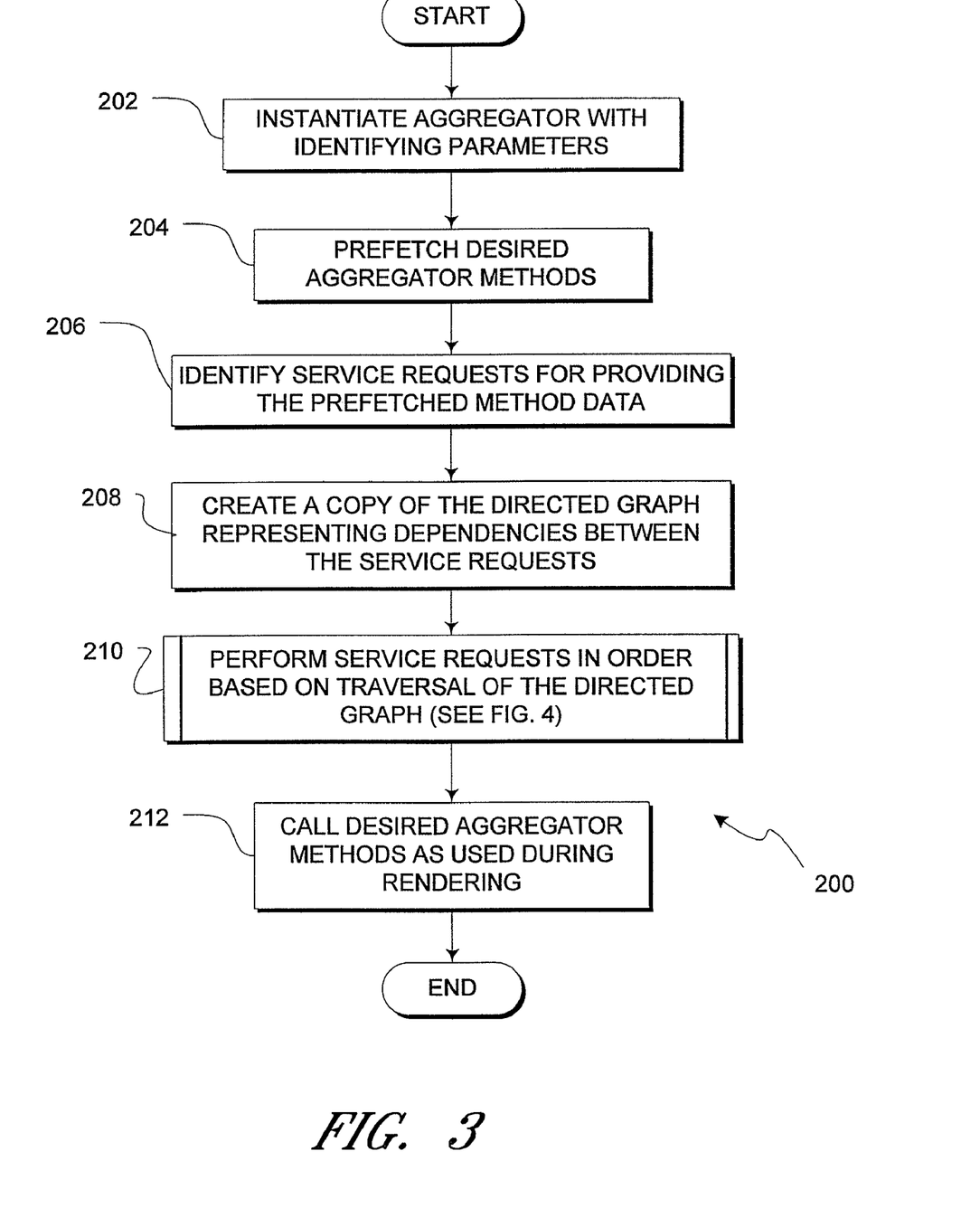
FIG. 3 is a flowchart illustrating a high level sequence of steps that may be performed by the web page generation system of FIG. 1 to generate a web page using the aggregation service.
Figure 4:
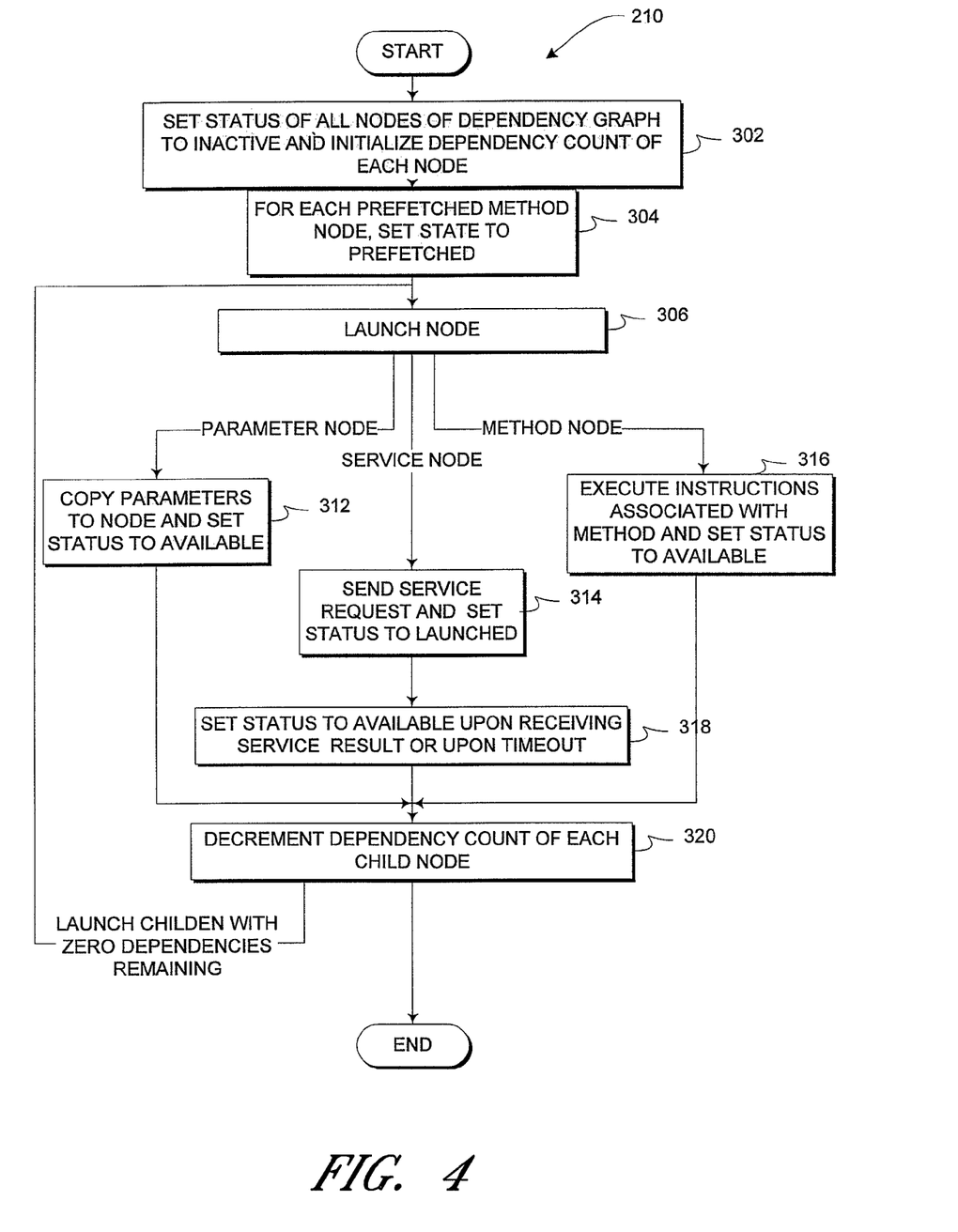
FIG. 4 is a flowchart illustrating in more detail a sequence of steps that may be performed by the aggregation service of FIG. 1 in issuing chained service requests to efficiently obtain and aggregate service request results.

FIGS. 3 and 4

FIG. 3 is a flowchart illustrating a high level sequence of steps of a method 200 that may be performed by the web page generation 100 system of FIG. 1 to generate a web page using the aggregation service. The method 200 begins at a block 202 in which a template for generating a requested web page instantiates a particular aggregator 120 with one or more identifying parameters. For purposes of illustration, it is assumed in this example that only a single aggregator 120 is invoked to generate the web page, although any number of aggregators may actually be invoked. The particular parameter or parameters passed to the invoked aggregator 120 will typically depend upon the particular collection of services 124 or service content the particular aggregator represents. For example, if the invoked aggregator is a "product" aggregator, the template processor may pass a list of one or more product identifiers specifying the products for which data is being requested from the product aggregator.

Next at a block 204, the template processor 114 prefetches the methods of the aggregator 120 to identify desired content object data, e.g., the specific types of product information, to be returned from the aggregator 120. In one embodiment, the template specifies the methods of the aggregator to prefetch as part of instantiating the aggregator 120. For example, the template may specify a list of methods to prefetch in a function call that instantiates the aggregator 120. The prefetching process thus identifies to the aggregator the particular types of data to be used by the template to generate the web page. Alternatively, the template can select all types of content object data available from the aggregator 120.

Moving to a block 206, the aggregator 120 identifies one or more service requests for providing the requested aggregator methods. Proceeding to a block 208, the aggregator 120 creates a copy of at least a portion of the directed acyclic graph that corresponds to the methods provided by the aggregator 120. The graph may be stored in memory as a table, a linked pointer structure, or any other suitable structure for storing a directed graph. Different aggregators 120 ordinarily use different directed graphs. The directed graph used by a particular aggregator 120 may be defined by the aggregator's author based on information, including dependency information, about the types of service requests the aggregator is capable of making. For example, the author of a particular aggregator may specify, based on the dependencies between the services used by a particular aggregator 120, the directed graph in a particular format or language that is processed at runtime by the aggregation system 118 to generate a particular instance of a particular aggregator 120.

Next at a block 210, the aggregator 120 traverses the directed graph and issues the service requests to the corresponding services 124 in an order based on the traversal. In one embodiment, the aggregator 120 begins with nodes corresponding to the prefetched methods. The methods may specify computation in addition to service requests. As discussed in further detail with reference to FIGS. 5A-5F, the aggregator recursively or iteratively traverses the graph to nodes that the method nodes depend upon until parameter or other dependency-free nodes are reached. The traversal then reverses direction and issues service requests in dependency order as needed data becomes available. The aggregator may issue multiple service requests concurrently, e.g., without waiting for the results of a first request before making a second request. Different portions of the graph may be traversed in parallel with corresponding service calls being issued concurrently or in parallel to substantially minimize overall latency. Proceeding to a block 212, the template may be executed or otherwise processed to generate the requested web page using data requested from the aggregator 120. In one embodiment, the template's execution may be blocked if requested data is not yet available from the aggregator 120. Note that block 212 may be performed at least partially concurrently or in parallel with blocks 208 and 210.

FIG. 4 is a flowchart illustrating in more detail a sequence of steps that may be included as part of block 210 of FIG. 3. Beginning at a block 302, the dependency graph is initialized with all nodes set to an inactive state. In one embodiment, a new directed graph data structure, which includes dynamic information such as the parameters of the particular instance of the aggregator 120 and storage for traversal state information, is generated from a static description or copy of the directed graph structure. The dynamic directed graph structure may include pointers or other references to the static structure. In addition, each node may include a dependency count that is initialized according to the dependency graph. Next at a block 304, the state of each node corresponding to a prefetched method is set to "prefetch," indicating that the service request data associated with the particular node is requested by the template. Nodes that the prefetched node depends upon are iteratively or recursively prefetched in a prefetch traversal until parameter or other dependency-free nodes are reached.

If a node is not requested, it will not be prefetched and its status will remain "inactive." A node that has been launched, e.g., a corresponding service request has been issued but results have not yet been received, is marked as launched until its results are available. In one embodiment, the "launched" status is only applied to service nodes because parameter and method nodes are available substantially as soon as launched.

When the service data corresponding to a node has been received from the corresponding service 124, the node is marked as "available." When the template requests a method of the aggregator 120 as it renders the web page, data is not returned to template unless the corresponding node is available. In one embodiment, available nodes may be marked with a code indicating the success or failure of the corresponding service request. The template's execution may block while a method corresponding to a node is not available.

Proceeding to a block 306, the aggregator 120 begins the launch traversal of the graph and launches one or more parameter nodes or other nodes that have no dependencies. If the launched node is a parameter node, the process proceeds to a block 312. If the node is a service node, the process proceeds to a block 314. If the node is a method node, the process proceeds to a block 316.

Returning to the block 312, if the launched node is a parameter node, the parameter values are copied to an instance the node and the nodes status is set to the available state. The process then continues to a block 318.

Returning to the block 314, if the launched node is a service node, parameters are received from available parameter or other service nodes and the corresponding service request is sent to the service 122. In addition, the status of the service node is set to "launched." Next at a block 318, when the aggregator 112 receives the results of the service request, the status of the node is set to available and the service request result provided to the node. Alternatively, if the service request times out or otherwise fails, the node is marked available and the timeout or failure condition noted as the value of the node. The process then continues to the block 318.

Returning to the block 316, if the launched node is a method node, the aggregator 120 performs any instruction code associated with the method and sets the status of the node to available. The instruction code associated with a particular method code may perform any computation, such as formatting the received service data for use by the template. Typically, the computation is based on the results received from one or more service requests. The process then moves to the block 318.

Proceeding to the block 318, the dependency count of each child node (dependent nodes to the right of the newly available node as in FIG. 1 is decremented). The process returns to the block 306 and each child with zero remaining dependencies is launched. In one embodiment, each such child is launched in parallel. Alternatively, each child with zero remaining dependencies may be launched sequentially, for example, by placing the node on a stack or queue of nodes to be launched.

III. ILLUSTRATION OF DATA STRUCTURE TRAVERSAL

FIG. 5

Figure 5A:
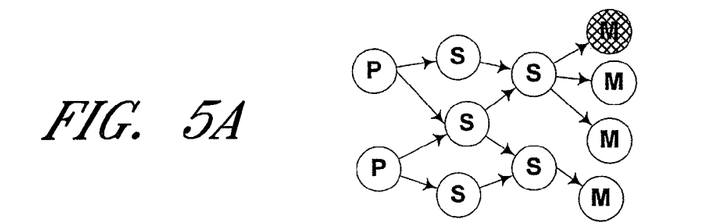
FIGS. 5A-5F are a series of block diagrams that graphically illustrate the traversal by the aggregation service of a dependency graph during execution of the process of FIG. 4.
Figure 5B:
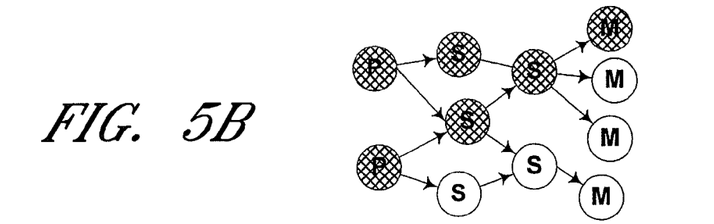

FIGS. 5A-5F are a series of block diagrams that graphically illustrate the traversal by the aggregation service 118 of a graph data structure that represents the dependencies of changed service requests such as performed by the steps illustrated in FIG. 4. FIG. 5A illustrates the dependency graph of FIG. 1 after the aggregator 120 begins traversing a directed graph in which a single method node has been prefetched. The prefetched status is indicated by crosshatching. FIG. 5B illustrates the same dependency graph after completion of the initial prefetch traversal. Each node from which the initial method node depends is marked in crosshatching to indicate that it has been prefetched.

Figure 5C:
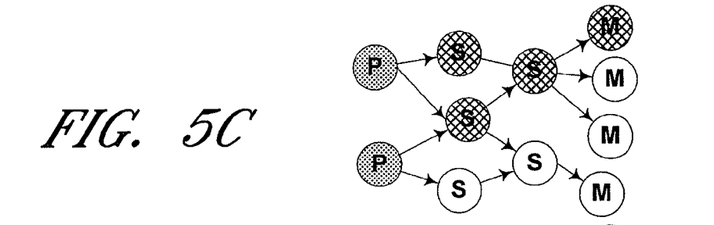
Figure 5D:
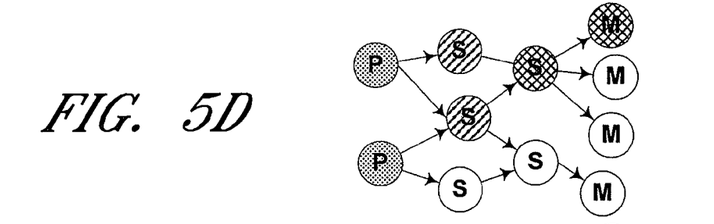
Figure 5E:
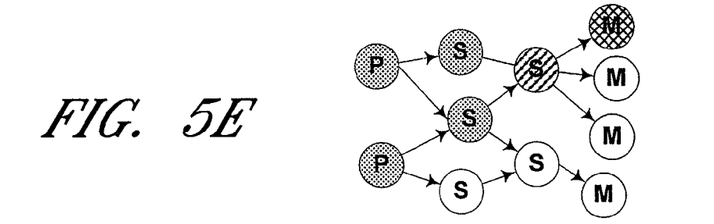
Figure 5F:
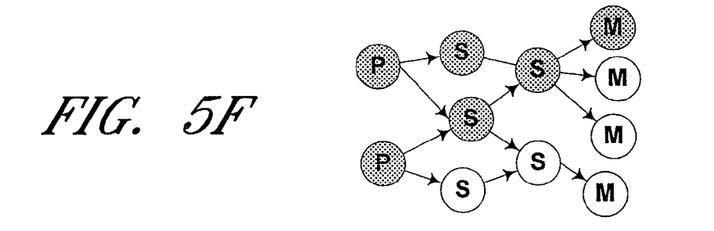

Next as shown in FIG. 5C, each of the parameter nodes has been marked as available as indicated by the dot-filled background of the "P" nodes. Proceeding to FIG. 5D, the available parameter values have been provided to two of the prefetched service nodes, which have been launched by sending the corresponding service requests. The launched status of these two service nodes is indicated by single hatching. After the service requests have returned results, as illustrated in FIG. 5E, the values are made available to the dependent service request (to the right on FIG. 5E) which is launched. After the launched service request node of FIG. 5E returns a result, as illustrated in FIG. 5F, the value is provided to the originally prefetched method node and all nodes are marked as available. The result of the prefetched method is thus available to be provided to the template and template processor 114 as requested during the rendering phase.

As illustrated, the aggregator 120 may begin issuing service calls concurrently with prefetching of other aggregator methods specified by the template. Thus, prefetched method values are advantageously available sooner than if the chained service requests were delayed until the template actually required the method values during rendering. Thus, in addition to aggregating multiple identical service requests, the use of the aggregator can also reduce overall latency or response time of a web page request.

In view of the above, one will recognize that various embodiments of the invention overcome many of the problems in the art. For example, in one embodiment, the system 100 provides a way of reducing unnecessary blocking of web page generation tasks while service requests are outstanding. Moreover, in one embodiment, only those service requests that correspond to prefetched aggregator methods are prefetched. In addition, in one embodiment, services requests may be issued as soon as any parameters that are dependent on other service requests are available, so that the results are available sooner for generation of the page request. As discussed above, the use of the aggregation service 118 also encapsulates the complexity of issuing chained service requests away from web page generation templates so as to simplify creation and maintenance of templates.

IV. CONCLUSION

As will be recognized, the present invention may be embodied in a form that does not provide all of the features and benefits set forth herein. For example, some of the features described above may be omitted, or may be implemented differently than described above. The scope of the invention is defined by the claims. Any references characters included in the claims are provided for convenience of description only, and are not intended to imply that the referenced steps or tasks need to be performed in a particular order.

What is claimed is:

1. A method of generating data used to dynamically generate web pages, the method comprising:
   receiving a request at a web server for a web page;
   in response to the request, processing at least one template for generating the web page, wherein processing the template comprises invoking at least one method of an aggregation component in order to initiate retrieval by the aggregation component, from a plurality of services, of data for generating the web page;
   via the aggregation component: (a) generating a graph structure that corresponds to the at least one method and specifies dependencies between service requests for retrieving the data from the plurality of services, (b) during dynamic generation of the web page, traversing the graph structure and using the graph structure i) to maintain, during generation of the web page, service request status information, and ii) to control order and timing with which individual service requests are sent to corresponding services at least in part based on traversing the graph structure and at least in part on the service request status information and (c) receiving results of the sent service requests from the plurality of services; and
   further processing the at least one template to generate the web page using the service request results received by the aggregation component.

2. The method of claim 1, wherein the web server sends the service requests to the corresponding service over a network.

3. The method of claim 1, wherein step (a) comprises generating a directed graph of the dependencies.

4. The method of claim 3, wherein the directed graph comprises a plurality of nodes, the nodes corresponding to at least one of a parameter, executable code, and a service request.

5. The method of claim 1, wherein step (a) comprises performing a first processing pass to identify said plurality of service requests.

6. The method of claim 5, wherein the first processing pass comprises the template requesting a plurality of methods that correspond to the plurality of service requests.

7. The method of claim 5, wherein further processing the at least one template comprises performing at least a second processing pass of the at least one template to generate the web page.

8. The method of claim 1, wherein the graph structure comprises nodes that represent particular service requests.

9. The method of claim 8, wherein the aggregation component uses the graph structure to maintain service request dependency status information during generation of the web page.

10. The method of claim 8, wherein the graph structure comprises at least one node that specifies executable instructions for formatting a received service request result for display.

11. The method of claim 1, the step of using the graph structure comprises repeatedly traversing at least a portion of the graph structure to identify dependent service requests that can be sent.

12. The method of claim 1, generating the graph structure comprises making a copy of a pre-defined graph structure.

13. The method of claim 1, wherein the timing is relative to others of the service requests.

14. The method of claim 1, further comprising aggregating identical service requests into a single service request to be sent to the corresponding service.

15. The method of claim 1, further comprising maintaining the service request status information in response to sending and receiving the service requests.

16. A web server comprising a memory and a processor programmed to perform a method of generating data used to dynamically generate web pages, the method comprising:
  receiving a request at a web server for a web page;
  in response to the request, processing at least one template for generating the web page, wherein processing the template comprises invoking at least one method of an aggregation component in order to initiate retrieval by the aggregation component, from a plurality of services, of data for generating the web page;
  via the aggregation component: (a) generating a graph structure that corresponds to the at least one method and specifies dependencies between service requests for retrieving the data from the plurality of services, (b) during dynamic generation of the web page, traversing the graph structure and using the graph structure i) to maintain, during generation of the web page, service request status information, and ii) to control order and timing with which individual service requests are sent to corresponding services at least in part based on traversing the graph structure and at least in part on the service request status information and (c) receiving results of the sent service requests from the plurality of services; and
  further processing the at least one template to generate the web page using the service request results received by the aggregation component.

17. A computer storage device which stores a computer program which, when executed, causes a processor to perform a method of generating data used to dynamically generate web pages, the method comprising:
  receiving a request at a web server for a web page;
  in response to the request, processing at least one template for generating the web page, wherein processing the template comprises invoking at least one method of an aggregation component in order to initiate retrieval by the aggregation component, from a plurality of services, of data for generating the web page;
  via the aggregation component: (a) generating a graph structure that corresponds to the at least one method and specifies dependencies between service requests for retrieving the data from the plurality of services, (b) during dynamic generation of the web page, traversing the graph structure and using the graph structure i) to maintain, during generation of the web page, service request status information, and ii) to control order and timing with which individual service requests are sent to corresponding services at least in part based on traversing the graph structure and at least in part on the service request status information and (c) receiving results of the sent service requests from the plurality of services; and
  further processing the at least one template to generate the web page using the service request results received by the aggregation component.

18. A system for dynamically generating documents, comprising:
  one or more processors;
  a template processor that uses document templates to dynamically generate documents using service data retrieved from services, said template processor comprising software executed by at least one of said one or more processors; and
  an aggregation component that acts as an intermediary between the template processor and a plurality of said services, and sends service requests to the plurality of services on behalf of, and in response to requests from, the template processor, said aggregation component comprising software executed by at least one of said one or more processors;
  wherein the aggregation component maintains information about dependencies between the service requests, and uses such information to control the order and timing, relative to dependent ones of the service requests, with which the service requests are sent to the plurality of services.

19. The system of claim 18, wherein the information about service request dependencies comprises a directed graph representing said dependencies.

20. The system of claim 19, wherein the directed graph comprises nodes that correspond to service requests, and the aggregation component traverses the directed graph to identify service requests that can be made.

21. The system of claim 18, wherein the template processor and aggregation component run on a common web server machine, and operate in conjunction to generate web pages in response to requests from client computing devices.

22. The system of claim 18, wherein said aggregation component is configured to aggregate a plurality of identical service requests from the template processor into a single service request sent to the service.

23. A computer system comprising:
  at least one web server machine having at least one processor configured to:
    receive a request for a web page;
    in response to the request, process at least one template for generating the web page, wherein processing the template comprises invoking at least one method of an aggregation component in order to initiate retrieval by the aggregation component, from a plurality of services, of data for generating the web page, wherein via the aggregation component the processor is further configured to: (a) generate a graph structure that corresponds to the at least one method and specifies dependencies between service requests for retrieving the data from the plurality of services, (b) during dynamic generation of the web page, traverse the graph structure and use the graph structure i) to maintain, during generation of the web page, service request status information, and ii) to control an order and a timing with which individual service requests are sent to corresponding services at least in part based on traversing the graph structure and at least in part on the service request status information, and (c) receive results of the sent service requests from the plurality of services; and further process the at least one template to dynamically generate the web page using the service request results received by the aggregation component;

a storage configured to store the at least one template.

* * * * *